(12) United States Patent
Kuramoto et al.

(10) Patent No.: US 10,008,699 B2
(45) Date of Patent: Jun. 26, 2018

(54) PACKAGE FOR POWER STORAGE DEVICE AND POWER STORAGE DEVICE

(71) Applicant: SHOWA DENKO PACKAGING CO., LTD., Isehara-shi, Kanagawa (JP)

(72) Inventors: Tetsunobu Kuramoto, Isehara (JP); Yuji Minamibori, Isehara (JP); Takashi Nagaoka, Isehara (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 9 days.

(21) Appl. No.: 15/196,211

(22) Filed: Jun. 29, 2016

(65) Prior Publication Data

US 2017/0005299 A1 Jan. 5, 2017

(30) Foreign Application Priority Data

Jul. 1, 2015 (JP) .................................. 2015-132732

(51) Int. Cl.
*H01M 2/02* (2006.01)
*H01M 10/0525* (2010.01)
*H01G 11/78* (2013.01)

(52) U.S. Cl.
CPC .......... *H01M 2/0202* (2013.01); *H01G 11/78* (2013.01); *H01M 2/026* (2013.01); *H01M 2/0262* (2013.01); *H01M 2/0267* (2013.01); *H01M 2/0275* (2013.01); *H01M 2/0277* (2013.01); *H01M 2/0285* (2013.01); *H01M 2/0287* (2013.01); *H01M 10/0525* (2013.01)

(58) Field of Classification Search
CPC .. H01M 2/0202; H01M 2/026; H01M 2/0262; H01M 2/0267; H01M 2/0275; H01M 2/0277; H01M 2/0285; H01M 2/0287; H01M 10/0525; H01G 11/78
See application file for complete search history.

(56) References Cited

U.S. PATENT DOCUMENTS

2009/0297930 A1* 12/2009 Koishikawa ........ H01M 2/1061
429/94
2014/0335404 A1* 11/2014 Takada .................... H01M 2/06
429/179

FOREIGN PATENT DOCUMENTS

JP        2005-022336 A        1/2005

* cited by examiner

*Primary Examiner* — Brittany Raymond
(74) *Attorney, Agent, or Firm* — Keating and Bennett, LLP

(57) ABSTRACT

A package for a power storage device includes a metal foil layer, an insulation layer laminated on at least center portion of one surface of the metal foil layer, and a heat-sealable resin layer arranged one surface of the metal foil layer or a region corresponding to a periphery of the one surface of the metal foil layer. With this, thinning, weight saving, and shortening of the production time can be attained.

10 Claims, 7 Drawing Sheets

PACKAGE FOR POWER STORAGE DEVICE AND POWER STORAGE DEVICE

The present application claims priority to Japanese Patent Application No. 2015-132732 filed on Jul. 1, 2015, the entire disclosure of which is incorporated herein by reference in its entirety.

BACKGROUND OF THE INVENTION

Field of the Invention

The present disclosure relates to a thin and light-weighted package for a power storage device, such as, e.g., a battery and a capacitor for use in a mobile device including, e.g., a smartphone and a tablet terminal, a battery or an electric condenser for use in, e.g., a hybrid vehicle, an electric vehicle, wind power generation, solar power generation, or nighttime electric power, and also relates to a power storage device externally covered by the package.

In this disclosure, the term "aluminum" is used to include the meaning of both aluminum and its aluminum alloys unless otherwise specifically defined.

Description of the Related Art

The following description of related art sets forth the inventor's knowledge of related art and certain problems therein and should not be construed as an admission of knowledge in the prior art.

In recent years, in accordance with thinning and weight saving of a mobile electric device, such as, e.g., a smart phone and a table terminal, as a packaging material for a power storage device, such as, e.g., a lithium ion secondary battery, a lithium polymer secondary battery, a lithium ion capacitor, and an electric double layer capacitor, which are to be loaded on such a mobile electric device, in place of a conventional metallic can, a laminated body made of a heat-resistant resin layer/an adhesive layer/a metal foil layer/an adhesive layer/a thermoplastic resin layer (See Japanese Unexamined Patent Application Publication No. 2005-22336, hereinafter referred to as "Patent Document 1") has been used. Normally, the laminated body is subjected to stretch forming or deep drawing into a three-dimensional shape such as an approximately rectangular parallelepiped shape. Further, an electric power source for an electric vehicle, and a large-size electric power source or capacitor used to store electric power, etc., are often packaged by the laminated body (package) of the aforementioned structure.

In the meantime, in the aforementioned mobile electrical device, etc., in recent years, a further thinning and weight saving have been developed. As a power storage device to be mounted thereon is required to be thinned and light-weighted. In accordance with this, developments have been made to attain the thinning and weight saving of a package for a power storage device. Currently, using an aluminum foil having a thickness having no possibility of pinhole generation or having a thickness thicker than that, the package is structured. It is known that as the thickness decreases, there is a possibility that pinholes are generated in an aluminum foil, and as the thickness decreases, the number of pinholes increases. In cases where there exist pinholes, the aluminum foil cannot fulfill a function as a barrier layer, which causes problems that an intrusion of moisture from an outside cannot be prevented and diffusion or leakage of electrolyte cannot be prevented. For this reason, an aluminum foil cannot be further decreased in thickness.

Further, as to a thermoplastic resin layer (heat-sealable resin layer) as an inner layer, if the layer is further reduced in thickness than a current level, it becomes difficult to secure a sufficient heat seal strength.

Therefore, for a product having the aforementioned structure as a fundamental structure, it was difficult to attain further thinning and weight saving.

Further, in a conventional structure, it requires about one week to age (cure) an adhesive agent after dry lamination, and therefore it has been required to attain shortening of the production time.

The description herein of advantages and disadvantages of various features, embodiments, methods, and apparatus disclosed in other publications is in no way intended to limit the present disclosure. For example, certain features of the preferred described embodiments of the disclosure may be capable of overcoming certain disadvantages and/or providing certain advantages, such as, e.g., disadvantages and/or advantages discussed herein, while retaining some or all of the features, embodiments, methods, and apparatus disclosed therein

SUMMARY OF THE INVENTION

The disclosed embodiments of the present invention have been developed in view of the above-mentioned and/or other problems in the related art. The disclosed embodiments of this invention can significantly improve upon existing methods and/or apparatuses.

Some embodiments of the present invention were made in view of the aforementioned technical background, and aim to provide a package for a power storage device and a power storage device capable of attaining thinning and weight saving, and shortening a production time.

The other purposes and advantages of some embodiments of the present invention will be made apparent from the following preferred embodiments.

In order to attain the aforementioned objects, the present disclosure provides the following means.

[1] A package for a power storage device, comprising:
a metal foil layer;
an insulation layer laminated at least on a center portion of one surface of the metal foil layer; and
a heat-sealable resin layer provided on one surface of the metal foil layer or a region corresponding to a periphery of the one surface of the metal foil layer.

[2] A package for a power storage, comprising:
a metal foil layer;
an insulation layer laminated on an entire surface of one surface of the metal foil layer; and
a heat-sealable resin layer laminated on a periphery of the insulation layer.

[3] A package for a power storage device, comprising:
a metal foil layer;
a heat-sealable resin layer laminated on a periphery of one surface of the metal foil layer;
an insulation layer laminated on a region surrounded by the heat-sealable resin layer on the one surface of the metal foil layer.

[4] The package for a power storage device as recited in any one of the aforementioned Items [1] to [3], wherein the insulation layer is made of a cured material of at least one resin selected from a group consisting of a resin including acid-modified polyolefin and polyfunctional isocyanate, a thermosetting resin, and a photocurable resin.

[5] The package for a power storage as recited in any one of the aforementioned Items [1] to [3], wherein the insulation layer is a layer not having a flowability at 150° C.

[6] The package for a power storage device as recited in any one of the aforementioned Items [1] to [3], wherein the heat-sealable resin layer is made of a heat-sealable resin layer formed into a frame shape in a plan view.

[7] The package for a power storage device as recited in any one of the aforementioned Items [1] to [5], wherein the heat-sealable resin layer is made of an applied coat layer of a heat-sealable resin.

[8] The package for a power storage as recited in any one of the aforementioned Items [1] to [7], wherein an acid-resistant layer is laminated on the other surface of the metal foil layer.

[9] The package for a power storage device as recited in the aforementioned Item [8], wherein the acid-resistant layer is made of one or more resins selected from the group consisting of a polyester resin, a polyamide resin, and a polyolefin resin.

[10] The package for a power storage device as recited in the aforementioned Item [8] or [9], wherein a coefficient of dynamic friction of an outer side surface of the acid-resistant layer is 0.5 or less.

[11] The package for a power storage device as recited in any one of the aforementioned Items [1] to [10], wherein a coefficient of dynamic friction of a surface of the insulation layer opposite to the metal foil layer.

[12] A power storage device comprising:
a power storage device body;
a first package configured by the package for a power storage device as recited in any one of the aforementioned Items [1] to [11]; and
a second package including a metal foil layer, and an insulation layer laminated on one surface of the metal foil layer, wherein the first package is formed into a three-dimensional shape including an accommodation case capable of accommodating the power storage device body and a sealing peripheral portion outwardly extending from a periphery of an upper opening of the accommodation case approximately in a horizontal direction, and
wherein the power storage device body is accommodated in the accommodation case of the first package, the second package is arranged on the power storage device body with an insulation layer side facing inward, and a periphery of the insulation layer of the second package and the heat-sealable resin layer of the sealing peripheral portion of the first package are joined and sealed.

[13] A power storage device comprising:
a power storage device body;
a first package configured by the package for a power storage device as recited in any one of the aforementioned Items [1] to [11]; and
a second package including a metal foil layer, and an insulation layer laminated on one surface of the metal foil layer,
wherein the second package is formed into a three-dimensional shape including an accommodation case capable of accommodating the power storage device body and a sealing peripheral portion outwardly extending from a periphery of an upper opening of the accommodation case approximately in a horizontal direction, and
wherein the power storage device body is accommodated in the accommodation case of the second package, the first package is arranged on the power storage device body with an insulation layer side facing inward, and the heat-sealable resin layer of a periphery of the first package and the insulation layer of the sealing peripheral portion of the second package are joined and sealed.

[14] A power storage device comprising:
a power storage device body;
a first package configured by the package for a power storage device as recited in any one of the aforementioned Items [1] to [11]; and
a second package including a metal foil layer, and an insulation layer laminated on one surface of the metal foil layer,
wherein the first package and the second package are each formed into a three-dimensional shape including an accommodation case capable of accommodating the power storage device body and a sealing peripheral portion outwardly extending from a periphery of an upper opening of the accommodation case approximately in a horizontal direction, and
wherein the first package and the second package are arranged so that insulation layers of the first and second packages face with each other, the power storage device body is accommodated in an accommodation space formed by an accommodation case of the first package and an accommodation case of the second package, and a heat-sealable resin layer of a sealing peripheral portion of the first package and an insulation layer of a sealing peripheral portion of the second package are joined and sealed.

In the aforementioned embodiment as recited in the aforementioned item [1], since the insulation layer is laminated at least on a center portion on one surface of the metal foil layer, the insulation property can be improved. Since the heat-sealable resin layer is not formed on the entire surface of one surface of the metal foil layer, but it is configured to form the heat-sealable resin layer on the periphery region of the package, and to provide an insulation layer capable of securing an insulation property even if it is reduced in thickness than the heat-sealable resin layer (heat sealing layer), and therefore thinning and weight saving of the package can be attained. Further, the heat-sealable resin layer is laminated on the periphery and therefore it is not required to provide an adhesive agent which requires a curing time to laminate the heat-sealable resin layer. Therefore, the production time can be shortened. The heat-sealable resin layer may be provided on the periphery of the package via an adhesive agent. This this case, it is enough to provide the adhesive agent only on the periphery, and therefore the region (area) for providing the adhesive layer can be reduced than a conventional device. With this, the aging (curing) time of the adhesive agent can be reduced, which in turn can reduce the production time.

In the embodiment as recited in the aforementioned item [2], since it is configured such that the insulation layer is laminated on the entire surface of one surface of the metal foil layer, the insulation property can be improved sufficiently. Since the heat-sealable resin layer is not formed on the entire surface of one surface of the metal foil layer, but it is configured to form the heat-sealable resin layer on the periphery region of the package, and to provide an insulation layer capable of securing an insulation property even if it is reduced in thickness than the heat-sealable resin layer (heat sealing layer), and therefore thinning and weight saving of the package can be attained. Further, the heat-sealable resin layer is laminated on the periphery of the insulation layer and therefore it is not required to provide an adhesive agent which requires a curing time between the insulation layer and the heat-sealable resin layer. Therefore, the production time can be shortened. An adhesive agent may be provided between the periphery of the insulation layer and the heat-sealable resin layer. In this case, it is enough to provide the adhesive agent on the periphery, and therefore the region (area) for providing the adhesive layer can be reduced than a conventional device. With this, the aging (curing) time of the adhesive agent can be reduced, which in turn can reduce the production time.

In the embodiment as recited in the aforementioned item [3], since it is configured such that the insulation layer is laminated at the region of one surface of the metal foil layer surrounded by the heat-sealable resin layer, the insulation property can be improved sufficiently. It is configured such that the heat-sealable resin layer is not formed on the entire surface of one surface of the metal foil layer, but formed at the periphery region of the package, and an insulation layer capable of securing an insulation property even if it is reduced in thickness than the heat-sealable resin layer (heat sealing layer) is provided at the surrounded regions, and therefore thinning and weight saving of the package can be attained. Further, the heat-sealable resin layer is laminated on the periphery of the metal foil layer and therefore it is not required to provide an adhesive agent which requires a curing time between the metal foil layer and the heat-sealable resin layer. Therefore, the production time can be shortened. An adhesive agent may be provided between the periphery of the metal foil layer and the heat-sealable resin layer. In this case, it is enough to provide the adhesive agent on the periphery, and therefore the region (area) for providing the adhesive layer can be reduced than a conventional device. With this, the aging (curing) time of the adhesive agent can be reduced, which in turn can reduce the production time.

In the embodiment as recited in the aforementioned item [4], the insulation layer is formed by a cured material of a specific resin and is a layer formed by applying and curing a resin, and therefore sufficient thinning can be attained. Further, the insulation layer is a cured material made of a resin, and therefore it is possible to prevent thinning (thickness decreasing) of the insulation layer at the time of heat-sealing the package.

In the embodiment as recited in the aforementioned item [5], since the insulation layer does not exert a flowability at 150° C., the insulation layer will not melt at the time of performing the heat-sealing. Therefore, sufficient insulation properties can be secured.

In the embodiment as recited in the aforementioned item [6], since the heat-sealable resin layer formed into a frame shape is used, the productivity can be improved.

In the embodiment as recited in the aforementioned item [7], since the heat-sealable resin layer is constituted by the applied coat layer of a heat-sealable resin, the heat-sealable resin layer can be formed thinner, which in turn can attain sufficient thinning and weight saving of the package.

In the embodiment as recited in the aforementioned item [8], since the acid-resistant layer is laminated on the other surface of the metal foil layer, the insulation properties against acid and/or acidic materials can be improved sufficiently.

In the embodiment as recited in the aforementioned item [9], since the acid-resistant layer is made of the aforementioned specific resin, the resistance characteristics against acid and/or acidic materials can be further improved.

In the embodiment as recited in the aforementioned item [10], since the coefficient of dynamic friction of the outside surface of the acid-resistant layer is 0.5 or less, scratches due to contact with machines, etc., at the time of producing the power storage device hardly occur, which can obtain effects of improving the deep drawing property and the stretch forming property.

In the embodiment as recited in the aforementioned item [11], since the coefficient of dynamic friction of the surface of the insulation layer opposite to the metal foil layer is 0.5 or less, scratches due to contact with machines, etc., at the time of producing the power storage device hardly occur, which can obtain effects of further improving the deep drawing property and the stretch forming property.

In the embodiments as recited in the aforementioned [12], [13] and [14], since it is configured such that the power storage device body is packaged by the package in which thinning and weight saving are performed and the production time is shortened, a power storage device which is thinned and weight saved and improved in productivity can be provided. By such thinning of the power storage device, the energy density of the power storage device can be improved.

BRIEF DESCRIPTION OF THE DRAWINGS

Embodiments of the present invention are shown by way of example, and not limitation, in the accompanying figures.

EMBODIMENTS FOR CARRYING OUT THE INVENTION

Figure 1:
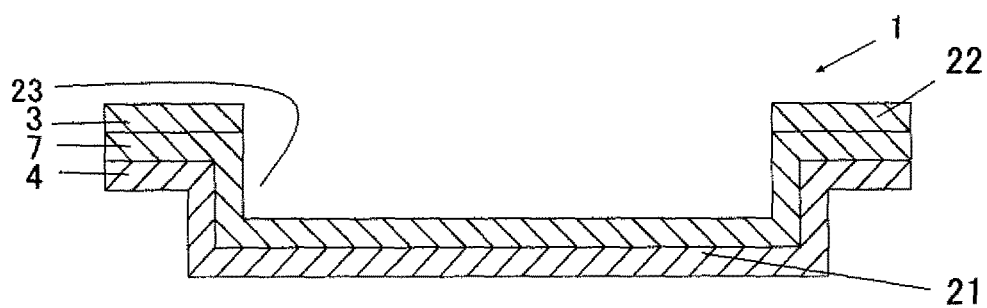
FIG. 1 is a cross-sectional view showing one embodiment of a package for a power storage device according to an embodiment of the present invention.

In the following paragraphs, some embodiments of the present disclosure will be described by way of example and not limitation. It should be understood based on this disclosure that various other modifications can be made by those in the art based on these illustrated embodiments.

A package 1 for a power storage device according to the embodiment of the present invention includes a metal foil layer 4, an insulation layer 7 laminated at least on a center portion of one surface of the metal foil layer 4, and a heat-sealable resin layer 3 provided on one surface of the metal foil layer 4 or a region corresponding to a periphery of the one surface of the metal foil layer 4. It may be configured such that, for example, the insulation layer 7 is laminated on the entire surface of one surface of the metal foil layer 4, or laminated on a center portion (region except the periphery) of one surface of the metal foil layer 4.

In the embodiment of the present invention, it is preferable that an acid-resistant layer 2 be laminated on the other surface of the metal foil layer 4. The lamination of this acid-resistant layer 2 can improve the resistance characteristics against acid or acidic materials as a package for a power storage device.

A package 1 for a power storage device according to an embodiment of the present invention is shown in FIG. 1. This package 1 for a power storage device includes a metal foil layer 4, an insulation layer 7 laminated on the entire surface of one surface of the metal foil layer 4, and a heat-sealable resin layer 3 formed on a periphery of the insulation layer 7. The heat-sealable resin layer 3 is of a frame shape in a plan view, and the heat-sealable resin layer 3 is integrally laminated on the periphery of the insulation layer 7 by thermal fusion bonding (see FIG. 1).

Figure 2:
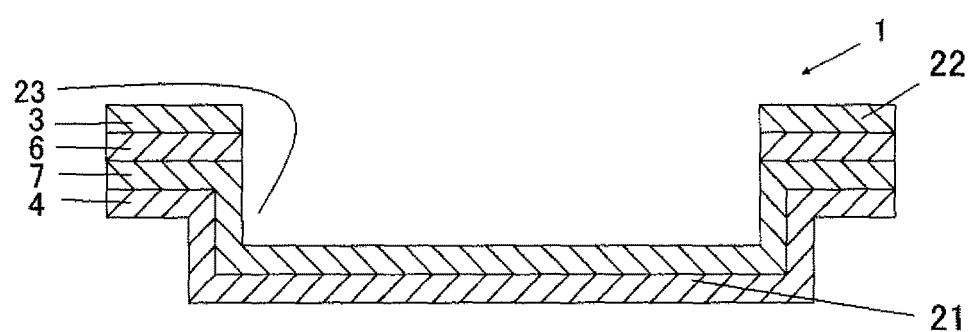
FIG. 2 is a cross-sectional view showing another embodiment of a package for a power storage device according to an embodiment of the present invention.

As shown in FIG. 2, the heat-sealable resin layer 3 may be integrally laminated via a second adhesive layer 6 formed on the periphery of the insulation layer 7 by being applied and dried.

Thus, in this embodiment, the package 1 for a power storage device is formed into a three-dimensional shape having an accommodation case 21 of an approximately rectangular parallelepiped shape with an upper opening capable of accommodating a power storage device body 31, and a sealing peripheral portion 22 outwardly extending from the periphery of the upper opening of the accommodation case 21 approximately in a horizontal direction (see FIG. 1). As a forming method for forming the three-dimensional shape, for example, deep drawing, stretch forming, etc., can be exemplified. To the upper surface (opening side surface) of the sealing peripheral portion 22, the heat-sealable resin layer 3 is exposed. The insulation layer 7 is arranged on the inner surface side of the accommodation case 21. The inner space (accommodation concave portion) 23 of the accommodation case 21 is formed to have a size and shape capable of accommodating a power storage device body 31 in an approximately fitted state.

Figure 3:
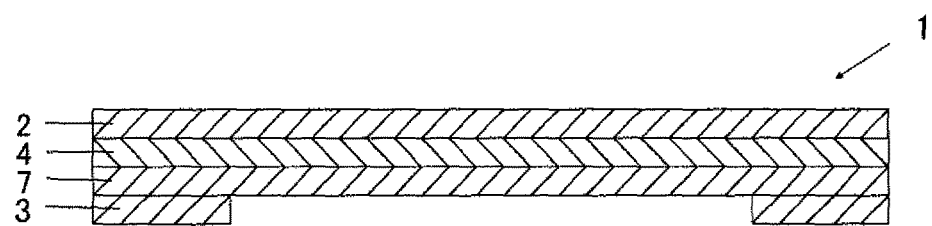
FIG. 3 is a cross-sectional view showing still another embodiment of a package for a power storage device according to an embodiment of the present invention.

A package 1 for a power storage device according to an embodiment of the present invention is shown in FIG. 3. This package 1 for a power storage device includes a metal foil layer 4, an insulation layer 7 laminated on the entire surface of one surface (lower surface) of the metal foil layer 4, and a heat-sealable resin layer 3 formed on the periphery of the insulation layer 7, and an acid-resistant layer 2 laminated on the other surface (upper surface) of the metal foil layer 4. The heat-sealable resin layer 3 is of a frame shape in a plan view, and the heat-sealable resin layer 3 is integrally laminated on the periphery of the insulation layer 7 by thermal fusion bonding (see FIG. 3). Further, the acid-resistant layer 2 is integrally laminated on the other surface (upper surface) of the metal foil layer 4 via a first adhesive layer (not illustrated) formed by being applied and dried. This package 1 for a power storage device shown in FIG. 3 is not subjected to shaping and will be used in a planar state.

Figure 4:
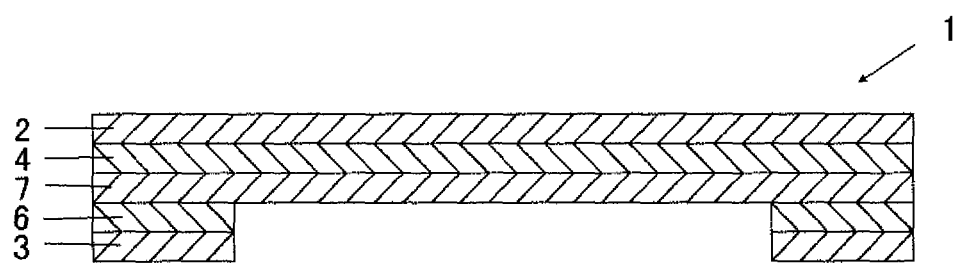
FIG. 4 is a cross-sectional view showing a further another embodiment of a package for a power storage device according to an embodiment of the present invention.

As shown in FIG. 4, the heat-sealable resin layer 3 may be integrally laminated on the periphery of the insulation layer 7 via a second adhesive layer 6 formed on the periphery of the insulation layer 7 by being applied and dries.

Figure 5:
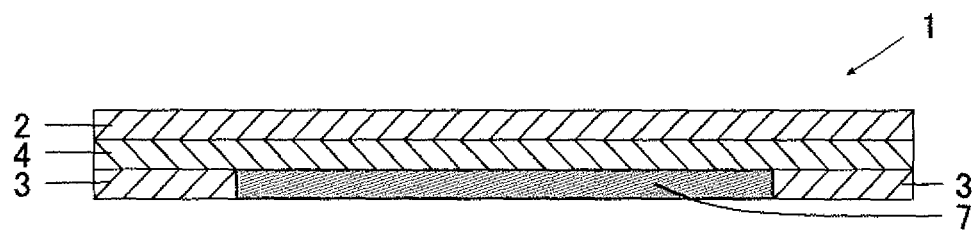
FIG. 5 is a cross-sectional view showing a yet another embodiment of a package for a power storage device according to an embodiment of the present invention.

A package 1 for a power storage device according to another embodiment of the present invention is shown in FIG. 5. This package 1 for a power storage device includes a metal foil layer 4, a heat-sealable resin layer 3 formed on the periphery of one surface (lower surface) of the metal foil layer 4, and an insulation layer 7 laminated on the region of the one surface (lower surface) of the metal foil layer 4 surrounded by the heat-sealable resin layer 3. The heat-sealable resin layer 3 is of a frame shape in a plan view, and the heat-sealable resin layer 3 is integrally laminated on the periphery of the metal foil layer 4 by thermal fusion bonding (see FIG. 5).

The heat-sealable resin layer 3 may be integrally laminated formed on the periphery of the metal foil layer 4 via a second adhesive layer formed by being applied and dries.

In the package 1 for a power storage device shown in FIGS. 1, 3, and 5, the heat-sealable resin layer is laminated on the periphery of the package, and therefore it is not required to provide an adhesive agent which requires a curing time for laminating a heat-sealable resin layer, and it is only required to heat-seal the heat-sealable resin layer 3 to the periphery. Therefore, the production time can be shortened. Also in the package 1 for a power storage device shown in FIGS. 2 and 4, it is configured such that the heat-sealable resin layer 3 is not formed on the entire surface of one surface of the metal foil layer, but formed on the peripheral region of the package. Therefore, it is only required to form the adhesive layer 6 on the periphery, which reduces the region (area) for providing the adhesive layer 6. With this, the aging (curing) time for the adhesive agent is shortened, which in turn can shorten the production time. Further, since it is configured such that the insulation layer 7 is laminated on the entire surface of one surface of the metal foil layer 4 (see FIGS. 1 to 4) or the insulation layer 7 is laminated on the region of one surface of the metal foil layer 4 surrounded by the heat-sealable resin layer 3 (see FIG. 5), the insulation property can be improved. Since it is configured such that the heat-sealable resin layer 3 is formed on the periphery region of the package 1 and the insulation layer 7 capable of securing the insulation property even if it is reduced in thickness than the heat-sealable resin layer (heat sealing layer) 3, thinning and weight saving of the package can be attained.

The package 1 for a power storage device according to the embodiment of the present invention can be used as a package by shaping into a three-dimensional shape having the accommodation case 21 and the sealing peripheral portion (flange portion) 22 extending from the periphery of the upper opening of the accommodation case 21 approximately in the horizontal direction, for example, as shown in FIGS. 1 and 2, by shaping (deep drawing, stretch forming, etc.) the package, and also can be used as it is in a planner shape without shaping the package as shown in FIGS. 3 to 5.

Figure 6:
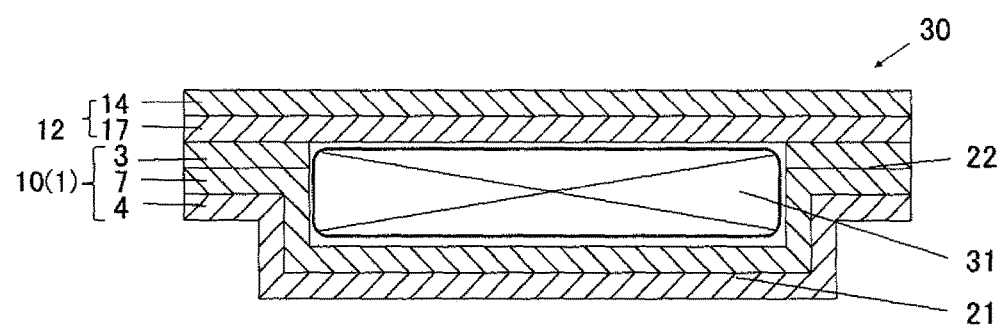
FIG. 6 is a cross-sectional view showing one embodiment of a power storage device according to an embodiment of the present invention.

A power storage device 30 constituted by a package 1 for a power storage device according to an embodiment of the present invention is shown in FIG. 6. This power storage device 30 is a lithium-ion secondary battery.

The power storage device 30 is equipped with a power storage device body 31, a first package 10 made of the aforementioned package 1 for a power storage device shown in FIG. 1, and a second package 12 in which an insulation layer 17 is laminated on one surface of the metal foil layer 14. The second package 12 is used in a planner shape as it is without being subjected to forming. The first package 10 is, as described above, formed into a three-dimensional shape having the accommodation case 21, and the sealing peripheral portion 22 extending from the periphery of the upper opening of the accommodation case 21 outwardly approximately in the horizontal direction, and the power storage device body 31 is accommodated in the accommodation case 21 of the first package 10, the second package 12 is arranged on the power storage device body 31 with an insulation layer 17 side facing inward, and a periphery of the insulation layer 17 of the second package 12 and the heat-sealable resin layer 3 of the sealing peripheral portion 22 of the first package 10 are sealed by heat-seal joining. Thus, the power storage device 30 is constituted (see FIG. 6).

Figure 7:
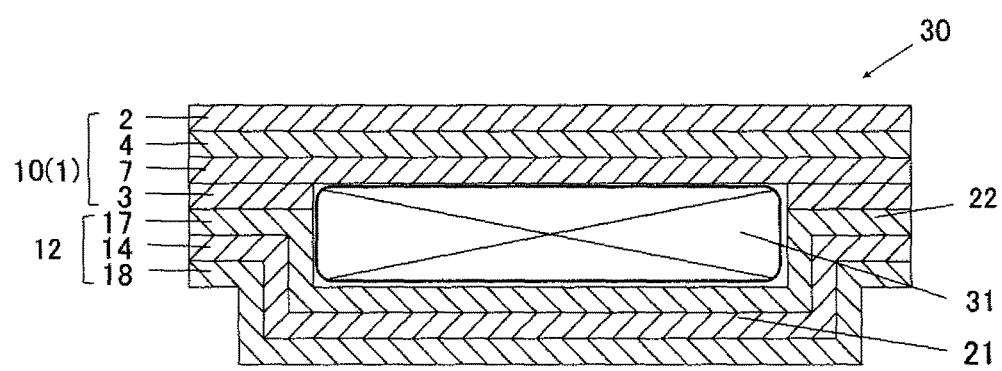
FIG. 7 is a cross-sectional view showing another of a power storage device according to an embodiment of the present invention.

Next, a power storage device 30 constituted using a package 1 for a power storage device according to an embodiment of the present invention is shown in FIG. 7. This power storage device 30 is a lithium-ion secondary battery.

The power storage device 30 is equipped with a power storage device body 31, a first package 10 made of the aforementioned package 1 for a power storage device shown in FIG. 3, and a second package 12 in which an insulation layer 17 is laminated on one surface of the metal foil layer 14 and an acid-resistant layer 18 is laminated on another surface of the metal foil layer 14. The acid-resistant layer 18 is integrally laminated on the other surface (lower surface) of the metal foil layer 14 via a first adhesive layer (not illustrated) formed by being applied and dried. The first package 10 is used in a planner shape as it is without being subjected to forming. The second package 12 is, as shown in FIG. 7, formed into a three-dimensional shape having the accommodation case 21 capable of accommodating the power storage device body 31, and the sealing peripheral portion 22 extending from the periphery of the upper opening of the accommodation case 21 outwardly approximately in the horizontal direction, and the power storage device body 31 is accommodated in the accommodation case 21 of the second package 12, the first package 10 of the planner shape is arranged on the power storage device body 31 with its insulation layer 7 side facing inward, and the heat-sealable resin layer 3 of the periphery of the first package 10 and the (upper surface) insulation layer 17 of the sealing peripheral portion 22 of the second package 12 heat-sealable resin layer 3 of the sealing peripheral portion 22 are sealed by heat-seal joining. Thus, the power storage device 30 is constituted (see FIG. 7).

Although not illustrated, the power storage device body 31 is equipped with, for example, a positive electrode collector, a positive-electrode active material, a separator, an electrolyte, a negative-electrode active material, a negative electrode collector, etc.

In the power storage device 30 shown in FIG. 6, the first package 10 is formed into a three-dimensional shape having the accommodation case 21, but the second package 12 is used in a planner shape. However, for example, in the power storage device shown in FIG. 6, as the second package 12, in place of a planner shape, it is possible to employ a structure (the embodiment of the present invention as recited in the aforementioned item [12]) in which the second package 12 (formed into a three-dimensional shape having the accommodated case 21) is used in FIG. 7. In this case, the power storage device body 31 is accommodated in the accommodation space formed by the accommodation case 21 of the first package 10 and the accommodation case 21 of the second package 12 (see FIG. 7).

In the embodiment of the present invention, the metal foil layer 4 and 14 plays a roll of giving a gas barrier property which prevents invasion of oxygen and/or moisture to the package 1. As the metal foil layer 4 and 14, although it is not specifically limited, for example, an aluminum foil, a copper foil, a stainless steel (SUS) foil, etc., are exemplified, and an aluminum foil and a stainless steel (SUS) foil are generally used. As a material of the aluminum foil, JIS H4160, A8079H-O, A8021H-O are preferable. The thickness of the metal foil layer 4 and 14 is preferably 20 µm to 100 µm. When the thickness is 20 µm or more, it is possible to prevent generation of pinholes at the time of pressing when manufacturing a metal foil. Further, when the thickness is 100 µm or less, the lightweight property can be secured, and the stress at the time of shaping can be reduced when performing shaping such as, e.g., stretch forming, drawing, which in turn can improve the formability.

In the metal foil layer 4 and 14, it is preferable that at least an inner side surface (surface on the insulation layer 7 and 17 side) is subjected to a chemical conversion treatment. By being subjected to such a chemical conversion treatment, corrosion of a metal foil surface by the contents (electrolyte of a battery, etc.) can be prevented sufficiently. For example, by being subjected to the following processing, a chemical conversion treatment is subjected to the metal foil. That is, on the surface of the metal foil to which a degreasing treatment was subjected, after applying any one of the following aqueous solutions 1) to 3) and then drying it to execute a chemical conversion treatment.

1) aqueous solution of a mixture containing phosphoric acid,
   chromic acid, and
   at least one compound selected from the group consisting of a metal salt of fluoride and a non-metallic salt of fluoride,
2) an aqueous solution of a mixture containing phosphoric acid,
   at least one resin selected from the group consisting of an acrylic resin, chitosan derivative resin, a phenolic resin, and
   at least one compounds selected from the group consisting of chromic acid, chromium (III) salt
3) an aqueous solution of a mixture containing phosphoric acid,
   at least one resin selected from the group consisting of an acrylic resin, a chitosan derivative resin, and a phenolic resin, and
   at least one compound selected from the group consisting of chromic acid and chromium (III) salt, and
   at least one compound selected from the group consisting of metal salt of fluoride, and non-metallic salt of fluoride.

In the chemical conversion coating film, the chromium adhesion amount (per one surface) is preferably 0.1 mg/m$^2$ to 50 mg/m$^2$, more preferably 2 mg/m$^2$ to 20 mg/m$^2$.

The heat-sealable resin layer (inner layer) 3 plays a role of giving excellent chemical resistance against electrolyte strong in corrosion for use in a lithium-ion secondary battery, etc., and giving a heat sealing property to the package.

At the resin constituting the heat-sealable resin layer 3, although it is not specifically limited, it is preferable to use at least one of heat-sealable resin selected from the group consisting of polyethylene, polypropylene, olefin copolymer, these acid-modified product, and ionomer.

The heat-sealable resin layer may be constituted by a heat-sealable resin layer, or may be constituted by an applied coat layer of a heat-sealable resin. In the case of the former, for example, a heat-sealable resin layer formed into a frame shape in a plan view may be used, or a heat-sealable resin layer of a plurality of ribbon-shapes (reed-shapes) may be used. In the case of the latter, the applied coat layer can be formed by applying an application liquid containing a heat-sealable resin and a solvent (solvent capable of dissolving the heat-sealable resin) and then drying it. As the solvent, although it is not specifically limited, for example, ethyl acetate, butyl acetate, propyl acetate, toluene, xylene, acetone, methyl ethyl ketone (MEK), methanol, ethanol, propanol, isopropanol, ethylene glycol, propylene glycol, cyclohexane, methylcyclohexane, water (emulsion), and their mixtures solvent, etc., can be exemplified.

The thickness of the heat-sealable resin layer 3 is preferably set to 10 µm to 80 µm when the heat-sealable resin layer is preferably formed by a heat-sealable resin layer, and when the heat-sealable resin layer is formed by an applied coat layer of a heat-sealable resin, it becomes possible to form a thin film of 1 µm to 10 µm in thickness. The heat-sealable resin layer 3 may be a single layer or a multilayer.

The insulation layer 7 and 17 are preferably formed by a cured material of a resin (including a resin composition). Since the cured material is a layer formed by applying a resin and curing it, sufficient thinning can be attained. The thickness of the insulation layer 7 and 17 is preferably set to 0.5 µm to 10 µm. By forming the insulation layer by applying a resin and drying it, it is possible to set to such a thin thickness. Among other things, the thickness of the insulation layer 7 and 17 is more preferably set to 1 µm to 5 µm.

Further, when the insulation layer 7 and 17 is made of a cured material of a resin, it is possible to prevent the insulation layer 7 and 17 from being decreased in thickness (thickness reduction) at the time of heat sealing the package 1.

It is especially preferable that the insulation layer 7 and 17 is made of a cured material of at least one resin selected from the group consisting of a resin including acid-modified polyolefin and polyfunctional isocyanate, a thermosetting resin, and a photocurable resin.

As the acid-modified polyolefin, although it is not specifically limited, for example, maleic acid-modified polypropylene, maleic acid modified polyethylene, ethylene-maleic anhydride-(meth)acrylate copolymer, ionomer, etc., can be exemplified. As the polyfunctional isocyanates, although it is not specifically limited, for example, an adduct of any one of hexamethylene diisocyanate (HDI), isophorone diisocyanate (IPDI), tolylene diisocyanate (TDI), diphenyl methane diisocyanate (MDI), polyfunctional isocyanate thereof, and polyfunctional alcohol such as trimethylol propane, isocyanurate-modified products, etc., can be exemplified.

As the thermosetting resin, although it is not specifically limited, for example, an epoxy resin, a melamine resin, an epoxy melamine resin, an acrylic resin, an urethane resin, a phenol resin, an alkyd resin, etc., can be exemplified. To the thermosetting resin, a curing accelerator such as a tertiary amine compound can be added.

As the photocurable resin, although it is not specifically limited, for example, urethane-modified acrylate, epoxy modified acrylate, acrylic resin acrylate, etc., can be exemplified. To these resins, as the polymerizable monomer, acrylate monomer, etc., is added, and further, as a photopolymerization initiator, a photopolymerization initiator such as benzophenone, acetophenone, thioxanthone, etc., is added. Curing is performed by applying the photocurable resin composition and drying it, and then irradiating an irradiation energy of integrated light quantity of 150 mW/m$^2$ or more using a UV lamp such as a metal halide lamp. When a thermosetting resin or a photocurable resin is used, the formation time of the insulation layer 7 can be shortened.

It is preferable that the insulation layer 7 and 17 do not show flowability at 150° C. In this case, the insulation layer 7 does not melt at the time of heat-sealing the package, and therefore sufficient insulation property can be secured.

It is preferable that the melting point of the insulation layer 7 and 17 be 140° C. or less. In this case, there is a merit. Among other things, it is especially preferable that the melting point of the insulation layer 7 and 17 is set to 120° C., more preferably 100° C. or less.

It is preferable that the insulation layer 7 and 17 be a cured resin layer having a gel fraction (degree of crosslinking) of 50% or more. In this case, sufficient insulation property can be secured. Among other things, it is more preferable that the gel fraction (degree of crosslinking) be 80% or more. The gel fraction (degree of crosslinking) is a degree of crosslinking (%) which is obtained by measuring in accordance with JIS K6796-1988. It is a gel fraction (degree of crosslinking) to be measured using xylene as an extraction solvent.

It is preferable that the coefficient of dynamic friction of the surface of the insulation layer 7 and 17 which is on the opposite side of the metal foil layer 4 be 0.5 or less. Among other things, it is especially preferable that coefficient of dynamic friction be 0.3 or less. The coefficient dynamic friction is a value (coefficient of dynamic friction) obtained by measuring the coefficient of dynamic friction of the same surface (surface of the insulation layer) of the package in accordance with JIS K7125-1999.

The insulation layer 7 and 17 is preferably formed by applying and curing a resin, but not limited to it, and may be formed using, for example, a resin film.

As a material constituting the acid-resistant layer (outer layer) 2 and 18, a material (heat resistant resin, etc.) which does not melt at a heat sealing temperature for heat-sealing a package. At the heat resistant resin, it is preferable to use a heat resistant resin having a melting point higher than the melting point of the heat-sealable resin constituting the heat-sealable resin layer 3 by 10° C. or more, and more preferably to use a heat resistant resin having a melting point higher than the melting point of the heat-sealable resin by 20° C. or more.

As the acid-resistant layer (outer layer) 2 and 18, although it is not specifically limited, for example, a polyamide film such as a nylon film, a polyester film, a polyolefin film, etc., are exemplified, and these oriented films are preferably used. Among other things, as the acid-resistant layer 2 and 18, any one of the following films are more preferable:

a biaxially oriented polyamide film such as a biaxially oriented nylon film;

a biaxially oriented polyester film such as a biaxially oriented polybutylene terephthalate (PBT) film, a biaxially oriented polyethylene terephthalate (PET) film, a biaxially oriented polyethylene naphthalate (PEN) film; and a biaxially oriented polyolefin film.

Among other things, it is especially preferable that the acid-resistant layer 2 and 18 be formed by a film layer selected from the group consisting of a multilayer film made of a biaxially oriented PET film/biaxially oriented nylon film, a biaxially oriented polybutylene terephthalate (PBT) film, and a biaxially oriented polyethylene naphthalate (PEN) film.

It is preferable that the thickness of the acid-resistant layer 2 and 18 be 2 µm to 50 µm. By setting it to the aforementioned preferable lower limit or above, a sufficient strength as a package can be secured. By setting it to the aforementioned preferable upper limit or below, the lightweight property can be maintained, and the stress at the forming can be reduced when performing stretch forming, drawing forming, etc., which in turn can improve the formability.

It is preferable that the coefficient of dynamic friction of the outer surface of the acid-resistant layer 2 and 18 (opposite side surface of the metal foil layer 4) be 0.5 or less. Among other things, it is especially preferable that the coefficient of dynamic friction be 0.3 or less. The coefficient of dynamic friction is a value (coefficient of dynamic friction) obtained by measuring the coefficient of dynamic friction of the same surfaces of the package (outer side surfaces of the acid-resistant layer) in accordance with JIS K7125-1999.

It is preferable that the acid-resistant layer 2 and 18 be laminated on the other surface of the metal foil layer 4 and 14 via a first adhesive layer (not illustrated).

As the first adhesive layer (not illustrated), although it is not specifically limited, for example, a polyurethane adhesive layer, a polyester polyurethane adhesive layer, a polyether polyurethane adhesive layer, etc., are exemplified. The thickness of the first adhesive layer is preferably set to 1 μm to 5 μm. Among other things, from the viewpoint of film-thinning and weight saving of the package, it is especially preferable that the thickness of the first adhesive layer be set to 1 μm to 3 μm.

In the case of employing the structure using the second adhesive layer 6, as the second adhesive layer 6, although it is not specifically limited, for example, it is possible to use a layer exemplified as the first adhesive layer, but it is preferable to use a polyolefin-based adhesive less swelling by electrolyte. The thickness of the second adhesive layer 6 is preferably set to 1 μm to 5 μm. Among other things, from the viewpoint of film-thinning and weight saving of the package, it is especially preferable that the thickness of the second adhesive layer be set to 1 μm to 3 μm.

In the aforementioned embodiment, the package 1 for a power storage device is configured such that the heat-sealable resin layer 3 is laminated on the periphery in advance. Instead of integrally laminating the heat-sealable resin layer, it can be configured as follows. As a separate member, a heat-sealable resin layer 3 of a frame shape in a plan view is prepared. When creating a power storage device by accommodating a power storage device body, a first package in which an insulation layer is laminated on one surface of the metal foil layer, a second package in which an insulation layer is laminated on one surface of the metal foil layer, a heat-sealable resin layer 3 of a frame shape in a plan view, and a power storage device body 31 are prepared. The heat-sealable resin layer 3 of the frame shape is arranged between the first package and the second package so that the respective insulation layers are arranged inward. The power storage device body 31 is accommodated in the accommodation space formed between the pair of packages. Then, the peripheries in which the heat-sealable resin layer 3 exists are heat-sealed to thereby obtain a power storage device 30. Also in this case, a power storage device 30 having a structure as shown in FIGS. 6 and 7 can be obtained.

In the power storage device of the aforementioned embodiment, among the pair of packages, the package 1 for a power storage device (first package 10) according to the embodiment of the present invention is used as one of packages, and a second package (the insulation layer is laminated on one surface of the metal foil layer) in which no heat-sealable resin layer 3 is provided is used as the other of packages. However, the package 1 for a power storage device (first package 10) according to an embodiment of the present invention may be used for both of the pair of packages. That is, the heat-sealable resin layer 3 of one of the package 1 for a power storage device and the heat-sealable resin layer 3 of the other of the package 1 for a power storage device are overlapped and heat-sealed to obtain a power storage device 30. Also in this case, a power storage device 30 having a structure as shown in FIGS. 6 and 7 can be obtained.

EXAMPLE

Next, concrete examples of the present invention will be described, but the present invention is not specifically limited to these examples.

Example 1

A chemical conversion treatment solution containing a compound of polyacrylic acid, phosphoric acid, chrome, and fluorine was applied on both surfaces of an aluminum foil having a thickness of 30 μm, and dried at 150° C. to attain a chromium adhesion amount of 3 mg/m².

A polyester-urethane adhesive was applied one surface of the aluminum foil (metal foil layer) subjected to the chemical conversion treatment. Thereafter, a biaxially oriented polyethylene terephthalate (PET) film (acid-resistant layer) having a thickness of 6 μm was adhered on the polyester-urethane adhesive applied surface.

Next, a resin composition containing maleic acid-modified polypropylene (melting point of 90° C., maleic anhydride content of 0.3 mass %) of 100 pts·mass, tolylenediisocyanate of 1 pts·mass, silica (anti-blocking agent) of 0.1 pts·mass, erucic acid amide (lubricant) of 0.2 pts·mass was applied on the entire surface of the other surface of the aluminum foil, and then cured by heating for one day at 80° C., to thereby form an insulation layer having a thickness of 3 μm.

Next, in a state in which the center portion of the surface of the insulation layer was masked (adhered by a masking tape), an application liquid having a composition of maleic acid-modified polypropylene of 15 pts·mass and toluene (solvent) of 75 pts·mass was applied and dried to form a maleic acid-modified polypropylene applied coat layer having a thickness of 5 μm on the periphery of the insulation layer, and the masking was removed to thereby obtain a package for a power storage device shown in FIG. 3.

Example 2

A chemical conversion treatment solution containing a compound of polyacrylic acid, phosphoric acid, chrome, and fluorine was applied on both surfaces of an aluminum foil having a thickness of 25 μm, and dried at 150° C. to attain a chromium adhesion amount of 3 mg/m².

A polyester-urethane adhesive was applied on one surface of the aluminum foil (metal foil layer) subjected to the chemical conversion treatment. Thereafter, a biaxially oriented polyethylene terephthalate (PET) film (acid-resistant layer) having a thickness of 2 μm was adhered on the polyester-urethane adhesive applied surface.

Next, a resin composition containing maleic acid-modified polypropylene (melting point of 90° C., maleic anhydride content of 0.3 mass %) of 100 pts·mass, tolylenediisocyanate of 1 pts·mass, silica (anti-blocking agent) of 0.1 pts·mass, erucic acid amide (lubricant) of 0.2 pts·mass was applied on the entire surface of the other surface of the aluminum foil, and then cured by heating for one day at 80° C., to thereby form an insulation layer having a thickness of 3 μm.

Next, a polypropylene film layer of a frame shape having a thickness of 15 μm and a width of 5 mm was overlapped on the periphery of the surface of the insulation layer and heat-sealed at 180° C. and 0.1 MPa to thereby a package for a power storage device shown in FIG. 3.

Example 3

In the same manner as in Example 1, a package for a power storage device shown in FIG. 3 was obtained except that in place of a biaxially oriented PET film having a thickness of 6 μm, a laminated film made of a biaxially oriented polyamide film of a biaxially oriented polyethylene terephthalate (PET) film of a thickness of 6 μm/a biaxially oriented polyamide film having a thickness of 20 μm was used (the polyamide film was arranged on inner side (aluminum foil side), and in place of the maleic acid-modified polypropylene contained application liquid, an application liquid having a composition of an epoxy melamine resin of 20 pts·mass, silica (anti-blocking agent) of 0.3 pts·mass, polyethylene wax (lubricant) of 0.2 pts·mass, toluene(solvent) of 64 pts·mass, MEK(solvent) of 16 pts·mass was applied and thereafter heated for one minute at 200° C. to heat cure to thereby form a heat cured layer of an epoxy-melamine resin having a thickness of 3 μm.

Example 4

A package for a power storage device shown in FIG. 3 was obtained in the same manner as in Example 3 except that the thickness of the aluminum foil was set to 40 μm, and in place of the laminate film of a biaxially oriented PET film having a thickness of 6 μm/a biaxially oriented polyamide film having a thickness of 20 μm, a laminate film of a biaxially oriented PET film having a thickness of 12 μm/a biaxially oriented polyamide film having a thickness of 25 μm was used (polyamide film was arranged on the the inner side (aluminum foil side).

Example 5

A package for a power storage device shown in FIG. 3 was obtained in the same manner as in Example 2 except that the thickness of the biaxially oriented polyethylene terephthalate (PET) film was set to 10 μm.

Example 6

A package for a power storage device shown in FIG. 3 was obtained in the same manner as in Example 2 except that the thickness of the biaxially oriented polyethylene terephthalate (PET) film was set to 9 μm and the thickness of the insulation layer was set to 5 μm.

Example 7

A package for a power storage device shown in FIG. 3 was obtained in the same manner as in Example 1 except that the thickness of the aluminum foil was set to 20 μm, and in place of the biaxially oriented PET film layer (single layer) having a thickness of 6 μm, a laminate film layer of a biaxially oriented PET film layer of a biaxially oriented PET film having a thickness of 6 μm/a biaxially oriented polyamide film having a thickness of 12 μm was used (polyamide film was arranged on the the inner side (aluminum foil side).

Example 8

A package for a power storage device shown in FIG. 3 was obtained in the same manner as in Example 1 except that the thickness of the aluminum foil was set to 20 μm, and in place of the biaxially oriented PET film layer (single layer) having a thickness of 6 μm, a laminate film layer of a biaxially oriented PET film having a thickness of 2 μm/a biaxially oriented polyamide film having a thickenss of 12 μm was used (polyamide film was arranged on the the inner side (aluminum foil side).

Example 9

A chemical conversion treatment solution containing a compound of polyacrylic acid, phosphoric acid, chrome, and fluorine was applied on both surfaces of a stainless steel foil having a thickness of 25 μm, and dried at 150° C. to attain a chromium adhesion amount of 3 mg/m$^2$.

A polyester-urethane adhesive was applied on one surface of a stainless steel foil (metal foil layer) subjected to the chemical conversion treatment. Thereafter, a biaxially oriented polyethylene terephthalate (PET) film (acid-resistant layer) having a thickness of 12 μm was adhered on the polyester-urethane adhesive applied surface.

Next, an application liquid having a composition containing epoxy melamine resin of 20 pts·mass, silica (anti-blocking agent) of 0.3 pts·mass, polyethylene was (solvent) of 0.2 pts·mass, toluene (solvent) of 64 pts·mass, MEK (solvent) of 16 pts·mass was applied on the entire surface of the other surface of the stainless steel foil, and then cured by heating for one minute at 200° C., to thereby form an insulation layer made of a heat cured layer of an epoxy melamine resin having a thickness of 5 μm.

Next, a polypropylene film layer of a frame shape having a thickness of 15 μm and a width of 5 mm was overlapped on the periphery of the surface of the insulation layer and heat-sealed at 180° C. and 0.1 MPa to thereby a package for a power storage device shown in FIG. 3.

Example 10

A package for a power storage device shown in FIG. 3 was obtained in the same manner as in Example 9 except that in place of the stainless steel foil having a thickness of 25 μm, an aluminum foil having a thickness of 25 μm was used, in place of the biaxially oriented PET film having a thickness of 12 μm, a biaxially oriented polybutylene terephthalate (PBT) film having a thickness of 12 μm was used, and the thickness of the insulation layer was set to a thickness of 3 μm, in place of the polypropylene film layer of a frame shape having a thickness of 15 μm, and a width of 5 mm, a maleic acid-modified polypropylene film layer of a frame shape having a thickness of 15 μm and a width of 5 mm was used.

Example 11

A package for a power storage device shown in FIG. 3 was obtained in the same manner as in Example 6 except that in place of the biaxially oriented PET film layer (single layer) having a thickness of 9 μm, a biaxially oriented polyamide film layer (single layer) having a thickness of 12 μm was used, and in place of the polypropylene film layer of a frame shape having a thickness of 15 μm, and a width of 5 mm, a maleic acid-modified polypropylene film layer of a frame shape having a thickness of 15 μm and a width of 5 mm was used.

Example 12

A chemical conversion treatment solution containing a compound of polyacrylic acid, phosphoric acid, chrome, and fluorine was applied on both surfaces of an aluminum foil having a thickness of 40 μm, and dried at 150° C. to attain a chromium adhesion amount of 3 mg/m$^2$.

Next, on the entire surface of one surface of the aluminum foil, a resin composition containing methyl acrylate resin acrylate (double bond equivalent:500, Mw:78000) of 30 pts·mass, phenoxy acrylate 1 pts·mass, benzophenone of 0.1 pts·mass, silica (anti-blocking agent) of 0.3 pts·mass, erucic acid amide (lubricant) of 0.2 pts·mass, toluene(solvent) of 78 pts·mass was applied, then ultraviolet ray was irradiated to the resin composition to light cure (curing condition: accumulated amount of 500 mJ/cm², peak irradiance of 500 mW/cm², metal halide lamp of 120 W/cm, 1 lump, a conveyer speed of light curing line of 10 m/min) to obtain an insulation layer made of a photocurable resin layer having a thickness of 5 μm.

Next, in a state in which the center portion of the surface of the insulation layer was masked (adhered by a masking tape), an application liquid having a composition of maleic acid-modified polypropylene of 15 pts·mass, toluene (solvent) of 52.5 pts·mass, and MEK (solvent) 22.5 pts·mass was applied and dried to form a maleic acid-modified polypropylene applied coat layer having a thickness of 5 μm on the periphery of the insulation layer, and the masking was removed to thereby obtain a package for a power storage device shown in FIG. 3.

Example 13

A chemical conversion treatment solution containing a compound of polyacrylic acid, phosphoric acid, chrome, and fluorine is applied on both surfaces of an aluminum foil having a thickness of 40 μm, and dried at 150° C. to attain a chromium adhesion amount of 3 mg/m².

Next, a resin composition containing maleic acid-modified polypropylene (melting point of 90° C., maleic anhydride content of 0.3 mass %) of 100 pts·mass, tolylenediisocyanate of 1 pts·mass, silica (anti-blocking agent) of 0.1 pts·mass, erucic acid amide (lubricant) of 0.2 pts·mass was applied on the entire surface of one surface of the aluminum foil, and then cured by heating for one day at 80° C., to thereby form an insulation layer having a thickness of 5 μm.

Thereafter, a polypropylene film layer of a frame shape having a thickness of 15 μm and a width of 5 mm was overlapped on the periphery of the surface of the insulation layer and heat-sealed at 180° C. and 0.1 MPa to thereby a package for a power storage device shown in FIG. 3.

Example 14

A package for a power storage device shown in FIG. 2 was obtained in the same manner as in Example 2 except that the thickness of the biaxially oriented polyethylene terephthalate (PET) film was to 12 μm, and in place of the polypropylene film layer of a frame shape having a thickness of 15 μm, and a width of 5 mm, a maleic acid-modified polypropylene film layer of a frame shape having a thickness of 10 μm and a width of 5 mm was used.

Comparative Example 1

A package for a power storage device was obtained in the same manner as in Example 2 except that a polyester urethane adhesive was applied on the "entire surface" of the surface of the insulation layer to form a polyester urethane adhesive layer, and a polypropylene film having a thickness of 15 μm was laminated on the "entire surface" of the surface of the adhesive layer, thereafter curing was performed for three days.

TABLE 1

| | Acid-resistant layer Type (Thickness (μm)) Outer side Inner side | Metal foil layer Type | Metal foil layer Thickness (μm) | Insulation layer Type | Insulation layer Thickness (μm) | Heat fusion resin layer (periphery) Type | Heat fusion resin layer (periphery) Thickness (μm) | Adhesive Curing term (Day) | Evaluation Delamination Yes, No |
|---|---|---|---|---|---|---|---|---|---|
| Ex. 1 | PET layer (6) | Aluminum | 30 | Maleic acid-modified PP + TDI | 3 | Acid denaturation PP coat layer | 5 | 0 | o |
| Ex. 2 | PET layer (2) | Aluminum | 25 | Maleic acid-modified PP + TDI | 3 | PP film layer | 15 | 0 | o |
| Ex. 3 | PET layer (6)/ Polyamide layer (20) | Aluminum | 30 | Epoxy melamine resin (thermosetting) | 3 | Acid denaturation PP coat layer | 5 | 0 | o |
| Ex. 4 | PET layer (12)/ Polyamide layer (25) | Aluminum | 40 | Epoxy melamine resin (thermosetting) | 5 | Acid denaturation PP coat layer | 5 | 0 | o |
| Ex. 5 | PET layer (10) | Aluminum | 25 | Maleic acid-modified PP + TDI | 3 | PP film layer | 15 | 0 | o |
| Ex. 6 | PET layer (9) | Aluminum | 25 | Maleic acid-modified PP + TDI | 5 | PP film layer | 15 | 0 | o |
| Ex. 7 | PET layer (6)/ Polyamide layer (12) | Aluminum | 20 | Maleic acid-modified PP + TDI | 3 | Acid denaturation PP coat layer | 5 | 0 | o |
| Ex. 8 | PET layer (2)/ Polyamide layer (12) | Aluminum | 20 | Maleic acid-modified PP + TDI | 3 | Acid denaturation PP coat layer | 5 | 0 | o |
| Ex. 9 | PET layer (12) | SUS | 25 | Epoxy melamine resin (thermosetting) | 5 | PP film layer | 15 | 0 | o |
| Ex. 10 | polybutylene terephthalate layer (12) | Aluminum | 25 | Epoxy melamine resin (thermosetting) | 3 | Acid denaturation PP film layer | 15 | 0 | o |
| Ex. 11 | Polyamide layer (12) | Aluminum | 25 | Maleic acid-modified PP + TDI | 5 | Acid denaturation PP film layer | 15 | 0 | o |
| Ex. 12 | — | Aluminum | 40 | Light curing resin layer | 5 | Acid denaturation PP coat layer | 5 | 0 | o |
| Ex. 13 | — | Aluminum | 40 | Maleic acid-modified PP + TDI | 5 | PP film layer | 15 | 0 | o |
| Ex. 14 | PET layer (12) | Aluminum | 25 | Maleic acid-modified PP + TDI | 3 | Acid denaturation PP film | 10 | 0 | o |
| Com. Ex. 1 | PET layer (2) | Aluminum | 25 | Maleic acid-modified PP + TDI | 3 | PP film layer (*1) | 15 | 3 | x |

(#1): Adhesive applied to entire surface and PP film all area layer

The following abbreviations in Table 1 denote the following respective words.
[PET]:polyethylene terephthalate
[PP]:polypropylene
[Acid denaturation PP]:maleic acid-modified polypropylene
[TDI]:tolylenediisocyanate
[SUS]:stainless steel

TABLE 2

| | coefficient of dynamic friction | | Formability assessment | |
|---|---|---|---|---|
| | Outer surface of acid-resistant layer | Outer surface of insulation layer | Maximum formed depth (mm) | Judgment result |
| Ex. 1 | 0.2 | 0.2 | 6 | ○ |
| Ex. 2 | 0.3 | 0.3 | 5 | ○ |
| Ex. 3 | 0.2 | 0.2 | 7 | ○ |
| Ex. 4 | 0.3 | 0.3 | 6 | ○ |
| Ex. 5 | 0.2 | 0.2 | 6 | ○ |
| Ex. 6 | 0.2 | 0.2 | 6 | ○ |
| Ex. 7 | 0.2 | 0.2 | 7 | ○ |
| Ex. 8 | 0.2 | 0.2 | 8 | ○ |
| Ex. 9 | 0.2 | 0.2 | 6 | ○ |
| Ex. 10 | 0.2 | 0.2 | 6 | ○ |
| Ex. 11 | 0.2 | 0.3 | 5 | ○ |
| Ex. 12 | — | 0.2 | 5 | ○ |
| Ex. 13 | — | 0.2 | 5 | ○ |
| Ex. 14 | 0.6 | 0.6 | 2 | Δ |

The coefficient of dynamic friction in Table 2 is a coefficient of dynamic friction measured in accordance with JIS K7125-1999. The coefficient of dynamic friction on the outer surface of the acid-resistant layer is a value (coefficient of dynamic friction) obtained by measuring the coefficient of dynamic friction of the same surfaces of the package (outer side surfaces of the acid-resistant layer). The coefficient of dynamic friction on the outer surface of the insulation layer is a value (coefficient of dynamic friction) obtained by measuring the coefficient of dynamic friction of the same surfaces of the package (outer side surfaces of the insulation layer).

Each package for a power storage device obtained as mentioned above was evaluated based on the following evaluation method.

<Formation Evaluation Method>

The package was formed into a blank shape of 110 mm×180 mm, and subjected to deep drawing one step forming by a forming depth free straight die. The formability was evaluated every each forming depth (9 mm, 8 mm, 7 mm, 6 mm, 5 mm, 4 mm, 3 mm, 2 mm), and the maximum forming depth capable of performing good forming without causing any cracks was investigated. Judgements are shown as follows: the maximum forming depth was 4 mm or more: "○"; the maximum forming depth was 1 mm or more, and less than 4 mm: "Δ", and the maximum forming depth was less than 1 mm: "x". These results are shown in Table 2. The used die punch shape was 60 mm in long side, 45 mm in short side, corner R: 1 to 2 mm, punch shudder R: 1 to 2 mm, and die shudder R: 0.5 mm.

<Evaluation of Presence or Absence of Delamination>

The package was formed into a blank shape of 110 mm×180 mm, and subjected to deep drawing one step forming using a straight die having a forming depth of 5 mm to obtain a shaped product. The obtained shaped product (processed product having a formed height of 5 mm) was left in a drying apparatus for three hours at 80° C., and then whether or not the shaped product had delamination (peeling) was visually observed. Non-delaminated products are shown as "○", and delaminated products are shown as "x". The results are shown in Table 1.

As will be apparent from Table 1, in the packages of Examples 1 to 14 of the present invention, the heat-sealable resin layer is provided not on the entire surface, but on the periphery, and it is possible to perform sufficient thinning of the insulation layer. Therefore, the thinning and weight saving as a package can be performed, and no delamination occurs even if produced without securing a curing term of the adhesive (zero day for curing term), and formability is excellent even if formation such as deep drawing, etc., is performed. This enables shortening of the production time and improvement of the productivity.

On the other hand, in the structure of Comparative Example 1 in which a PP film was laminated on the entire surface by applying adhesive to the entire surface like a conventional product, if the curing term for the adhesive is shortened to three days (not normal one week), the curing becomes insufficient, causing delamination of the package (see Table 1).

INDUSTRIAL APPLICABILITY

The package for a power storage device can be preferably used as, for example, a battery package, or a capacitor package, but not limited to them.

Further, the power storage device according to the present invention can be preferably used, for example, but not limited:

1) a lithium polymer battery, a lithium ion battery, a lithium ion capacitor, or an electric double layer capacitor used for a mobile device such as a smartphone and a tablet terminal;

2) a power source for hybrid vehicles, electric vehicles, etc.; and 3) a battery or a capacitor used for storing an electric power for wind power generation, solar power generation, or nighttime electric power It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

DESCRIPTION OF SYMBOLS

1 . . . package for a power storage device
2 . . . acid-resistant layer (outer layer)

3 . . . heat-sealable resin layer (inner layer)
4 . . . metal foil layer
7 . . . insulation layer
10 . . . first package
12 . . . second package
14 . . . metal foil layer
17 . . . insulation layer
21 . . . accommodation case
22 . . . sealing peripheral portion
30 . . . power storage device
31 . . . power storage device body

The invention claimed is:

1. A package for a power storage device, comprising:
a metal foil layer;
an insulation layer laminated at least on a center portion of one surface of the metal foil layer; and
a heat-sealable resin layer provided on only a periphery of one surface of the metal foil layer or only a region corresponding to the periphery of the one surface of the metal foil layer, such that the heat-sealable resin layer has a frame shape in a plan view; wherein
the insulation layer is made of a cured material of at least one resin selected from a group consisting of a resin including acid-modified polyolefin and polyfunctional isocyanate, a thermosetting resin, and a photocurable resin.

2. The package for a power storage as recited in claim 1, wherein the insulation layer is a layer not having a flowability at 150° C.

3. The package for a power storage device as recited in claim 1, wherein the heat-sealable resin layer is made of an applied coat layer of a heat-sealable resin.

4. The package for a power storage as recited in claim 1, wherein an acid-resistant layer is laminated on the other surface of the metal foil layer.

5. The package for a power storage device as recited in claim 4, wherein the acid-resistant layer is made of one or more resins selected from the group consisting of a polyester resin, a polyamide resin, and a polyolefin resin.

6. The package for a power storage device as recited in claim 4, wherein a coefficient of dynamic friction of an outer side surface of the acid-resistant layer is 0.5 or less.

7. The package for a power storage device as recited in claim 1, wherein a coefficient of dynamic friction of a surface of the insulation layer opposite to the metal foil layer is 0.5 or less.

8. A power storage device comprising:
a power storage device body;
a first package configured by the package for a power storage device as recited in claim 1; and
a second package including a metal foil layer, and an insulation layer laminated on one surface of the metal foil layer,
wherein the first package is formed into a three-dimensional shape including an accommodation case capable of accommodating the power storage device body and a sealing peripheral portion outwardly extending from a periphery of an upper opening of the accommodation case approximately in a horizontal direction, and
wherein the power storage device body is accommodated in the accommodation case of the first package, the second package is arranged on the power storage device body with an insulation layer side facing inward, and a periphery of the insulation layer of the second package and the heat-sealable resin layer of the sealing peripheral portion of the first package are joined and sealed.

9. A power storage device comprising:
a power storage device body;
a first package configured by the package for a power storage device as recited in claim 1; and
a second package including a metal foil layer, and an insulation layer laminated on one surface of the metal foil layer,
wherein the second package is formed into a three-dimensional shape including an accommodation case capable of accommodating the power storage device body and a sealing peripheral portion outwardly extending from a periphery of an upper opening of the accommodation case approximately in a horizontal direction, and
wherein the power storage device body is accommodated in the accommodation case of the second package, the first package is arranged on the power storage device body with an insulation layer side facing inward, and the heat-sealable resin layer of a periphery of the first package and the insulation layer of the sealing peripheral portion of the second package are joined and sealed.

10. A power storage device comprising:
a power storage device body;
a first package configured by the package for a power storage device as recited in claim 1; and
a second package including a metal foil layer, and an insulation layer laminated on one surface of the metal foil layer,
wherein the first package and the second package are each formed into a three-dimensional shape including an accommodation case capable of accommodating the power storage device body and a sealing peripheral portion outwardly extending from a periphery of an upper opening of the accommodation case approximately in a horizontal direction, and
wherein the first package and the second package are arranged so that insulation layers of the first and second packages face with each other, the power storage device body is accommodated in an accommodation space formed by an accommodation case of the first package and an accommodation case of the second package, and a heat-sealable resin layer of a sealing peripheral portion of the first package and an insulation layer of a sealing peripheral portion of the second package are joined and sealed.

* * * * *